United States Patent
Bernard et al.

(10) Patent No.: US 8,826,502 B2
(45) Date of Patent: Sep. 9, 2014

(54) METHOD FOR MAKING A SUBSTANTIALLY PLANAR MICRO-FLUID EJECTION HEAD

(75) Inventors: David Laurier Bernard, Lexington, KY (US); Paul William Dryer, Lexington, KY (US); Andrew Lee McNees, Lexington, KY (US)

(73) Assignee: Funai Electric Co., Ltd., Osaka (JP)

( * ) Notice: Subject to any disclaimer, the term of this patent is extended or adjusted under 35 U.S.C. 154(b) by 1142 days.

(21) Appl. No.: 12/786,457

(22) Filed: May 25, 2010

(65) Prior Publication Data
US 2010/0229391 A1   Sep. 16, 2010

Related U.S. Application Data

(62) Division of application No. 11/848,246, filed on Aug. 31, 2007, now Pat. No. 7,815,289.

(51) Int. Cl.
*H04R 17/00* (2006.01)
*B41J 2/16* (2006.01)
*C09J 5/02* (2006.01)
*B41J 2/14* (2006.01)

(52) U.S. Cl.
CPC *C09J 5/02* (2013.01); *B41J 2/1623* (2013.01); *C09J 2400/146* (2013.01); *B41J 2/1646* (2013.01); *B41J 2002/14491* (2013.01); *B41J 2/1645* (2013.01); *B41J 2/1642* (2013.01); *B41J 2/16* (2013.01)
USPC ........ 29/25.35; 29/592.1; 29/890.1; 156/252; 156/292; 347/65; 347/68; 347/70; 347/71

(58) Field of Classification Search
USPC ........ 29/25.35, 890.1; 347/50, 54–59, 61–65, 347/68, 70, 71; 156/252, 292
See application file for complete search history.

(56) References Cited

U.S. PATENT DOCUMENTS

| | | | | |
|---|---|---|---|---|
| 4,178,403 | A * | 12/1979 | Sakurai et al. | 430/5 |
| 7,287,831 | B2 * | 10/2007 | Silverbrook | 347/49 |
| 7,735,952 | B2 * | 6/2010 | Bernard et al. | 347/20 |
| 7,766,455 | B2 * | 8/2010 | Graham et al. | 347/47 |
| 7,914,127 | B2 * | 3/2011 | Martina et al. | 347/71 |
| 8,324,076 | B2 * | 12/2012 | Bernard et al. | 438/455 |
| 2005/0151710 | A1 * | 7/2005 | Sanada et al. | 345/84 |
| 2009/0295869 | A1 * | 12/2009 | Martina et al. | 347/47 |

FOREIGN PATENT DOCUMENTS

JP   10181015 A  *  7/1998

\* cited by examiner

*Primary Examiner* — Paul D Kim
(74) *Attorney, Agent, or Firm* — Amster, Rothstein & Ebenstein LLP

(57) ABSTRACT

A process for making a substantially planar micro-fluid ejection head is disclosed, and includes depositing a basic solution on a first surface of a device substrate. The first surface having the basic solution deposited thereon is contacted together with a surface of a support material for a duration ranging from about 1 minute to about 15 minutes, at a temperature ranging from about 20° C. to about 90° C. so that the first surface having the basic solution deposited thereon and the surface of the support material form a bond therebetween to hermetically seal the support material and the device substrate to one another. Both the substrate and the at least one surface of the support comprise silicon, and at least one of the device substrate and the at least one surface of the support material is substantially composed of silicon.

19 Claims, 3 Drawing Sheets

METHOD FOR MAKING A SUBSTANTIALLY PLANAR MICRO-FLUID EJECTION HEAD

This application claims priority and benefit as a divisional application of U.S. patent application Ser. No. 11/848,246, filed Aug. 31, 2007, now U.S. Pat. No. 7,815,289.

TECHNICAL FIELD

The disclosure relates to a micro-fluid ejection head and, in a particular exemplary embodiment, to a silicon structure for a device, such as a micro-fluid ejection head, hermetically sealed and bonded to a support material, where neither the bonded surface of the ejection head nor the bonded surface of the support material are required to be substantially planar.

BACKGROUND AND SUMMARY

Micro-fluid ejection devices such as ink jet printers continue to experience wide acceptance as economical replacements for laser printers. Micro-fluid ejection devices also are finding wide application in other fields such as in the medical, chemical, and mechanical fields. As the capabilities of micro-fluid ejection devices are increased to provide higher ejection rates, the ejection heads, which are the primary components of micro-fluid ejection devices, continue to evolve and become larger, more complex, and more costly to manufacture.

One significant obstacle to be overcome in micro-fluid ejection head manufacturing processes is maintaining the position and alignment of the ejection device substrate, also referred to as the ejection chip, and the nozzle plate during and after the manufacturing process, particularly when manufacturing ejection heads having an ejection swath dimension of greater than about 2.5 centimeters. The position and alignment of the ejection chip and the nozzle plate determine the direction in which a fluid such as ink is dispensed.

The position and alignment of the micro-fluid ejection head components may be affected by significant mismatches in coefficients of thermal expansion ("CTE") between the various members of the ejection head, including the nozzle plate, the device substrate, the base support, and any adhesive material used in securing the aforementioned components to one another.

Current manufacturing processes may utilize an adhesive die-bonding material to secure the device substrate of the ejection head to a support material. However, such adhesive requires thermal curing which may cause expansion and contraction of the components and may lead to warping or bowing of the ejection device substrate and the nozzle plate. Alterations in the thickness of the adhesive layer or the thickness of the underlying support material have led to only marginal improvements in the planarity of the finished devices. However, current manufacturing processes are limited by the size of the ejection chip. As the demand for larger ejection chips having larger ejection swaths increases, new device construction methods may be required to meet high tolerance manufacturing criteria for such ejection heads.

Accordingly, there is a need for improved structures and methods for making substantially planar micro-fluid ejection heads, suitable for ejection chips having an ejection swath dimension of greater than about 2.5 centimeters.

With regard to the above and other objects, the present disclosure is directed to a micro-fluid ejection head having a device substrate with a first surface and a second surface opposite the first surface. At least one fluid flow slot is formed therein from the first surface to the second surface. At least one micro-fluid ejection actuator is adjacent to the second surface. The first surface of the device substrate is hermetically sealed using a basic solution to a support material having at least one fluid flow slot formed therein. The slot in the support is associated with the fluid flow slot in the device substrate. The first surface of the device substrate may be non-planar. One or more of the surfaces of the support may also be non-planar. Both the substrate and the support may comprise silicon, with at least one of the substrate and the support being substantially composed of silicon.

In another aspect of the present disclosure, a process for making a substantially planar micro-fluid ejection head is provided. The process includes depositing a basic solution on a first surface of a device substrate sufficient to wet the first surface of the device substrate. The device substrate has at least one fluid flow channel slot therein and at least one micro-fluid ejection device formed adjacent to a second surface thereof. Next, the wetted surface is contacted together with a surface of a support material for a duration ranging from about 1 minute to about 15 minutes at temperature ranging from about 20° C. to about 90° C., thereby hermetically sealing the support and the device substrate to one another. Both the support and the device substrate may comprise silicon, and at least one of the support and the device substrate may be composed substantially of silicon.

In another embodiment of the present disclosure, a method of bonding a first substrate to a second substrate is provided. The method includes wetting a surface of the first substrate with an aqueous solution of tetramethylammonium hydroxide (TMAH). The wetted surface of the first substrate is contacted to a surface of the second substrate. Both the first substrate and the second substrate may be selected from the group consisting of silicon substrates and substrates containing a silicon oxynitride, silicon carbide, silicon oxide or silicon nitride layer adjacent to the TMAH solution. In some embodiments, only one of the first and second substrates may be wetted with TMAH prior to bonding, while in other embodiments, both substrates may be wetted with TMAH prior to bonding.

A further embodiment of the present disclosure provides a silicon device made by the methods described herein.

Another aspect of the present disclosure provides a method for bonding a first substrate to a second substrate. The method includes applying a silicon-containing basic solution to a surface of the first substrate. The surface having the solution deposited thereon may be contacted together with a surface of the second substrate for a period of time ranging from about 1 minute to about 15 minutes, at a temperature ranging from about 20° C. to about 90° C., with a pressure ranging from about 1 psi to about 50 psi. The method may be performed under an atmosphere selected from the group consisting of hydrogen gas and a hydrogen-containing forming gas. The surfaces having the solution deposited thereon may comprise silicon.

Still another aspect of the present disclosure provides a substantially unitary device structure. The structure may comprise a first substrate, a layer of silicate glass, and a second substrate. The layer of silicate glass may be interposed between the first substrate and the second substrate, and may form a hermetic seal between a surface of the first substrate and a surface of the second substrate. The surface of the first substrate adjacent the layer of silicate glass and the surface of the second substrate adjacent the layer of silicate glass may comprise silicon.

An advantage of the structures and method of the present disclosure is that bond may be formed at a relatively low temperature, thus eliminating heat curing steps of the presently used die-bonding adhesive methods that may result in bowing or warping of the device substrate and nozzle plate due to CTE mismatch between the different materials. In the presently disclosed structure and method, a thinner silicon wafer may be used for the device substrate than with conventional manufacturing techniques, thereby providing a reduction in materials cost for producing micro-fluid ejection devices. Another advantage of the present disclosure is that a covalent bond between the device substrate and the support material provides a hermetic seal that is not susceptible to attack or degradation by fluids such as ink, unlike adhesive die-bonding materials.

BRIEF DESCRIPTION OF THE DRAWINGS

Further advantages of the exemplary embodiments may become apparent by reference to the detailed description of the exemplary embodiments when considered in conjunction with the following drawings illustrating one or more non-limiting aspects of thereof, wherein like reference characters designate like or similar elements throughout the several drawings as follows.

DESCRIPTION OF THE EXEMPLARY EMBODIMENTS

Figure 1:
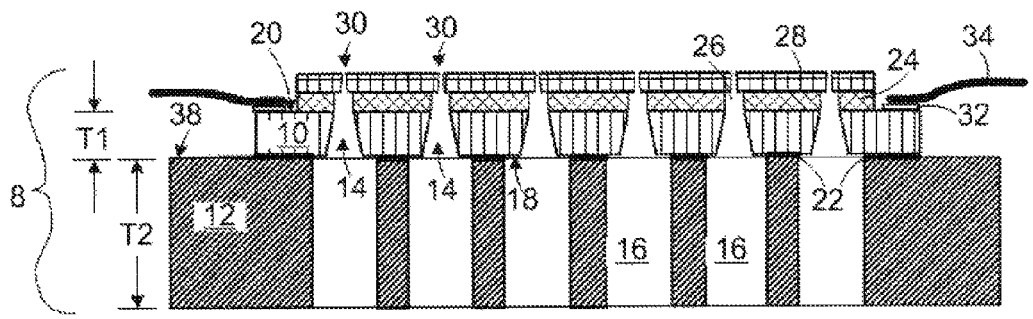
FIG. 1 is a cross-sectional view, not to scale, of a micro-fluid ejection head structure according to an embodiment of the present disclosure.

With reference to FIG. 1, the present disclosure is directed to a substantially planar micro-fluid ejection head 8 comprising a device substrate 10 and a support material 12. The device substrate 10 has at least one fluid flow slot 14 formed therein. The support material 12 has at least one fluid flow slot 16 formed therein that corresponds to the slot 14 on the device substrate 10. The device substrate 10 additionally has a first surface 18 and a second surface 20 opposite the first surface. The first surface 18 of the device substrate 10 is hermetically bonded to the support material 12 at one or more points of contact 22 between the device substrate 10 and the support material 12.

The device substrate 10 may further comprise a layer of flow feature material 24 attached adjacent to the second surface 20 of the device substrate 10. The flow feature material 24 has at least one fluid flow channel and chamber 26 formed therein that corresponds to the slot 14 in the device substrate 10. A nozzle plate 28 having at least one fluid ejection aperture 30 corresponding to the chamber 26 in the flow feature material 24 is attached adjacent to the flow feature material 24. The device substrate 10 additionally may have a bond pad electrical connection 32 for connecting an electrical lead tab 34 of a flexible circuit to the device substrate 10.

The device substrate 10 may be a portion of a preformed silicon semiconductor wafer, or any functionally similar material, having a first surface 18 and a second surface 20 and at least one fluid flow slot 14 formed therein, as described above. At least one micro-fluid ejection actuator (not shown here) may be adjacent to the second surface 20 in association with the slot 14 and in electrical communication with a driver circuit (not shown) also adjacent to the second surface 20. The device substrate 10 may have a thickness T1 ranging from about 10 to about 1000 microns. In the case of a relatively thin substrate 10, e.g. a substrate having a thickness of 200 microns or less, the relatively thick support material 12 may be required to maintain the planarity of the substrate 10.

The flow feature material 24 may be a substantially planar patterned layer of photoresist or any similar material wherein at least one fluid flow channel and chamber 26 has been formed therein by the removal of at least a portion of the flow feature material 24.

The nozzle plate 28 may be a photoresist nozzle plate, a polyimide nozzle plate, a metal nozzle plate, or other substantially planar patternable or micro-machinable material suitable for the purpose of providing fluid ejection apertures 30 therein. In the case of a patternable flow feature layer 24, the nozzle plate 28 may be laminated to, spun on, or adhesively attached to the flow feature layer 24.

The support material 12 may be a preformed portion of a glass or silicon wafer, or another material having a layer of silicon oxynitride, silicon carbide, silicon nitride, silicon oxide or glass deposited upon a surface thereon. The support material 12 may have at least one fluid flow slot 16 formed therein, corresponding to the slot 14 on the device substrate 10. The slot 16 permits fluid flow from a fluid reservoir (not shown) to the slot 14 of the device substrate 10. The support material may have a thickness T2 ranging from about 1 mm to about 5 mm. Multiple thin layers of material may also be used to provide the support material 12. The multiple thin layers may include one or more materials that have been hermetically sealed to one another by a method described below, to provide a single support material 12.

In the present disclosure, the device substrate 10 may be hermetically sealed at one or more points of contact 22 to the support material 12 in order to prevent fluid leakage from the device or intermixing of fluids in adjacent fluid flow slots 16. The nozzle plate aperture 30, flow feature channel and chamber 26, device substrate slot 14, and support material slot 16 are aligned so that fluid may flow continuously from a fluid reservoir (not shown) to the actuators on the second surface 20 of the device substrate 10 for ejection through the nozzle apertures 30. Alignment fiducials may optionally be present on the support material 12 for the purpose of ensuring proper alignment of the support material 12 to the device substrate 10. In another embodiment of the present disclosure, infrared cameras may be used by an automated system in order to ensure proper alignment of the components. Such methods of aligning different layers are well known to those skilled in the art.

Figure 2:
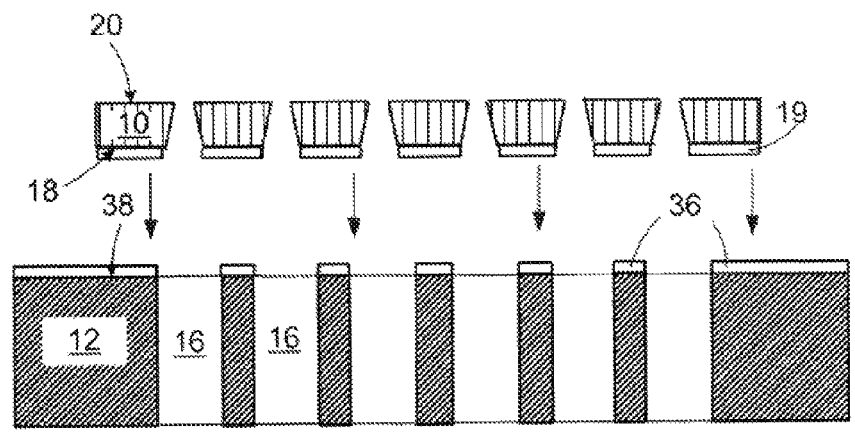
FIG. 2 is a cross sectional exploded view, not to scale, of a silicon substrate and a silicon oxide support material prior to bonding.

With reference to FIG. 2, and referring back to FIG. 1, a further embodiment of the present disclosure is directed to a process for making a substantially planar micro-fluid ejection head 8. The process includes wetting at least a first surface 18 of the device substrate 10 with a small amount of basic solution, so that a layer 19 of basic solution is formed on the surface 18. The thickness of the layer 19 of basic solution may range from about 0.1 to about 10 microns, and may suitably range from about 1 to about 5 microns. In an alternative process, a surface 38 of the support material 12 may also be wetted with the basic solution, so that a layer 36 of basic solution is formed on the surface 38. The wetted surfaces 18 and 38 having the layers of basic solution 19 and 36 may then be contacted with one another at a temperature ranging from about 20° C. to about 90° C., for a time duration ranging from about 1 minute to about 15 minutes, at which point bonds may spontaneously form between the two contacted surfaces 18 and 38, thereby forming a hermetic seal. In one exemplary embodiment, the surfaces may be pressed together with a pressure ranging from about 1 psi to about 50 psi to promote bonding of the surfaces 18 and 38 to one another.

In embodiments of the present disclosure, one or more of the device substrate and the support material may comprise silicon. For example, the device substrate may be substantially composed of silicon, for example a monocrystalline silicon wafer. The support material may be substantially composed of silicon, silicon oxide, silicon oxynitride, silicon carbide, silicon nitride, glass, or other silicon-containing material suitable for providing support to the device substrate. The support material may also comprise a non-silicon material having a bonding layer deposited upon a surface thereof.

In the case of a non-silicon support material 12, a silicon-containing bonding layer (not shown) may be deposited on the surface 38 of the support material 12 prior to the formation of the layer 36. A suitable non-silicon support material may include alumina and other ceramic materials. In the case of a silicon support material 12, the bonding layer may be formed by oxidation of the surface 38 of the silicon support material 12. The bonding layer may be an insulator, such as silicon carbide, silicon oxynitride, silicon oxide, silicon nitride, spun-on-glass ("SOG"), or amorphous silicon, formed using chemical vapor deposition ("CVD") or plasma-enhanced CVD ("PECVD"), sputtering, or evaporation. Other silicon-containing materials such as polymers, semiconductors or sintered materials may also be used.

In one embodiment, hexamethyldisiloxane ("HMDS") may be applied to a non-silicon surface, such as an alumina surface, of the support substrate 12 to form a silicon bonding layer on the alumina surface. Such a non-silicon surface having a silicon bonding layer formed thereon may be suitable for bonding with a silicon substrate using the presently disclosed methods.

In an exemplary embodiment of the present disclosure, the bonding process may include contacting one or more of the surfaces 18 and 38 with a solution containing a base, wherein the base is selected from tetramethylammonium hydroxide (TMAH), KOH, NaOH, NH$_4$OH, LiOH, hydrazine, ethylene-diamine-pyrocatecol (EDP), ethelene-piperidine-pyrocatechol (EPP), and the like. The solution may be aqueous. The concentration of the aqueous solution may range from about 0.5 to about 5 weight %, and as a further example from about 1 to about 3 weight %. In one embodiment the solution may be from about 1 to about 3% by weight of TMAH based on the total weight of the solution. Contacting the surfaces 18 and 36 with the solution may be accomplished by spraying, roll coating, dipping, vapor deposition, or immersion of the surfaces 18 and 36 in the solution.

In another exemplary embodiment of the present disclosure, one or more of the surfaces 18 and 36 may be wetted with the basic solution, and the two surfaces 18 and 36 may subsequently be contacted together at a temperature ranging from about 20° C. to about 90° C., for a period of time ranging from about 1 minute to about 15 minutes. The contacted surfaces may be pressed together using pressure ranging from about 1 psi to about 50 psi. As a further example, a force ranging from about 5 psi to about 15 psi may be used to press the two surfaces together. In one suitable embodiment, the force may be about 10 psi. Covalent bonds may spontaneously form between the two surfaces 18 and 36 at points of contact 22, forming a substantially hermetic seal between the two surfaces 18 and 36.

The two surfaces 18 and 36 may be hermetically sealed together by covalent bonds to provide a substantially unitary structure. Additional force, pressure, or temperature may or may not be required to be applied to the device substrate 10 and the support material 12 during the contacting of the two surfaces 18 and 36 in order to allow them to achieve favorable proximity for bond formation.

TMAH, KOH, NaOH, LiOH, CsOH, NH$_4$OH, hydrazine, EDP, and EPP are known in the art as silicon etchants. However, the use of these chemicals to effect the bonding of two surfaces to one another is heretofore unknown. It is believed that the basic solution may dissolve some of the surface of the silicon wafer, thereby forming a bonding material believed to be a silicate glass that adheres a silicon-containing material to the silicon wafer. When the basic solution wetted surface is contacted with a silicon, silicon oxide, silicon oxynitride, silicon carbide, or silicon nitride surface the silicate glass forms a hermetic bond at the junction of the two surfaces, such that the layer of silicate glass may be interposed between the two surfaces.

Without desiring to be bound by theory, it is believed that the following reactions occur when the silicon is contacted by a basic solution as described by Madou in *Fundamentals of Microfabrication*. First, as seen in Equation 1, elemental silicon is attacked by hydroxide ions to form $Si(OH)_2^{2-}$.

$$Si + 2OH^- \rightarrow Si(OH)_2^{2-} + 2e^- \tag{1}$$

A second reaction then occurs as the $Si(OH)_2^{2-}$ is then further attacked by hydroxide ions, leading to $Si(OH)_4$, as shown in Equation 2.

$$Si(OH)_2^{2-} + 2OH^- \rightarrow Si(OH)_4 + 2e^- \tag{2}$$

The third reaction is the conversion of $Si(OH)_4$ with water to produce soluble $Si(OH)_6$ and hydrogen gas.

$$Si(OH)_4 + 4e^- + 4H_2O \rightarrow Si(OH)_6^{2-} + 2H_2 \tag{3}$$

The present process may be conducted under a hydrogen gas atmosphere, thus forcing the reaction back towards the $Si(OH)_4$ product, which is unstable and spontaneously converts to silicate glass. It is this silicate glass formation that that is believed to provide the strong bonding between the two surfaces.

Gasses suitable for providing a hydrogen gas atmosphere may include pure hydrogen gas, or one or more hydrogen-containing forming gasses. A forming gas is a non-combustible mixture of an inert gas and a reactive gas. In embodiments of the present disclosure, suitable forming gasses may include nitrogen/hydrogen mixtures, argon/hydrogen mixtures, helium/hydrogen mixtures, and the like. The forming gas may comprise a major amount of the inert gas and a minor amount of the reactive gas. For the purposes of this disclosure, a major amount is defined as greater than 50% by volume, and a minor amount is defined as less than 50% by volume, of the total forming gas volume. One suitable example of a forming gas may be a mixture of 95% by volume of $N_2$ and 5% by volume of $H_2$. As another suitable example, the forming gas may be a mixture of 95% by volume of He and 5% by volume of $H_2$. Still another suitable forming gas may be a mixture of 30% $H_2$ and 70% Ar by volume.

In a further embodiment of the present disclosure, a material suitable for bonding two silicon oxide surfaces may be prepared by dissolving a small amount of silicon in an aqueous solution of TMAH, while maintaining the solution in a hydrogen rich atmosphere. In one embodiment, sufficient silicon may be dissolved in the TMAH to form a slurry. The amount of silicon dissolved in the TMAH solution may range from about 0.1 to about 10 percent by weight based on the total weight of the solution. The TMAH/silicon slurry may then be applied to one or more of the surfaces. The surfaces may subsequently be contacted together under an atmosphere containing hydrogen gas for a duration ranging from about 1 minute to about 15 minutes, at a temperature ranging from about 20° C. to about 90° C., using a pressure ranging from about 1 psi to about 50 psi, while maintaining the surfaces in the hydrogen atmosphere.

In an exemplary embodiment of the present disclosure, the device substrate 10, flow feature material 24, and nozzle plate 28 are assembled as a single unit prior to the activation of the first surface of the device substrate 10 and initiation of bonding with the support material 12. In other embodiments, the device substrate 10 may first be bonded to the support material 12 prior to attaching the flow feature material 24 and the nozzle plate 28 to the device substrate 10. The flow feature material 24 and the nozzle plate 28 may be, in a further embodiment, integrated as a single component before being attached to the device substrate 10. Since the thickness T2 of the support material 12 is desirably greater than the thickness T1 of the device substrate 10, any bowing of the device substrate 10 before the device substrate 10 is bonded to the support material 12 may be eliminated once the device substrate 10 is bound to the support material 12.

Figure 3:
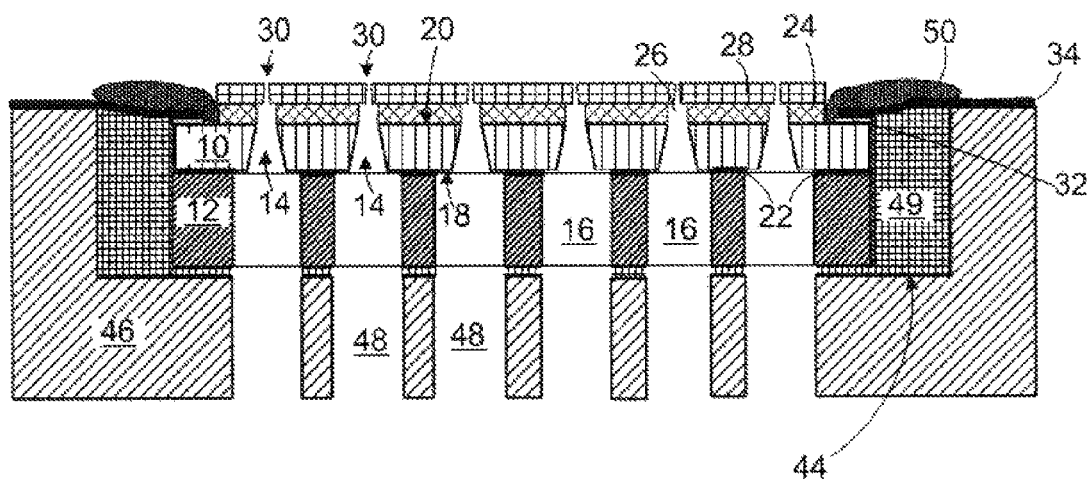
FIG. 3 is a cross-sectional view of a micro-fluid ejection head structure according to another embodiment of the present disclosure.

After the device substrate 10, including the nozzle plate 28 and the flow feature material 24, and the support material 12 have been bound to one another, the entire ejection head 8 may be inserted into and adhesively attached within a recessed cavity 44 of a plastic fluid reservoir or bottle 46, as illustrated in FIG. 3. Alternatively, the support material 12 may be adhesively attached within the recessed cavity 44 of the bottle 46 prior to bonding an assembled ejection head 8 or an unassembled device substrate 10 to the support material 12. The cavity 44 may have at least one slot 48 for fluid flow corresponding to the at least one slot 16 on the support material 12. Electrical leads 34 of a flexible circuit may be attached to the electrical connections 32 on the device substrate before the assembled fluid ejection head 8 is bonded or otherwise fixedly adhered to the bottle 46 using adhesive 49. In order to reduce or eliminate corrosion of the electrical leads 34 and connections 32, a protective encapsulant material 50 may be applied as a protective barrier over the electrical leads 34 and connections 32. The adhesive 49 may be of sufficient thickness to fill any gaps existing between the ejection head 8 and the bottle 46 in the cavity 44 as shown in FIG. 3, for example from about 0.1 microns to about 10 microns in thickness. As a further example, the adhesive layer may range from about 1 micron to about 5 microns in thickness.

As set forth above, it is desirable that the support material 12 that is hermetically bonded to the device substrate 10 be comprised of a material that has a similar CTE to the device substrate 10. Both the thickness of the support material 12 and the CTE similarity may lead to a reduction of warping of the ejection head 8 during the subsequent curing or annealing of any adhesive 49 and/or encapsulant 50 materials used to assemble the ejection head 8 and bottle 46 to one another.

Figure 4:
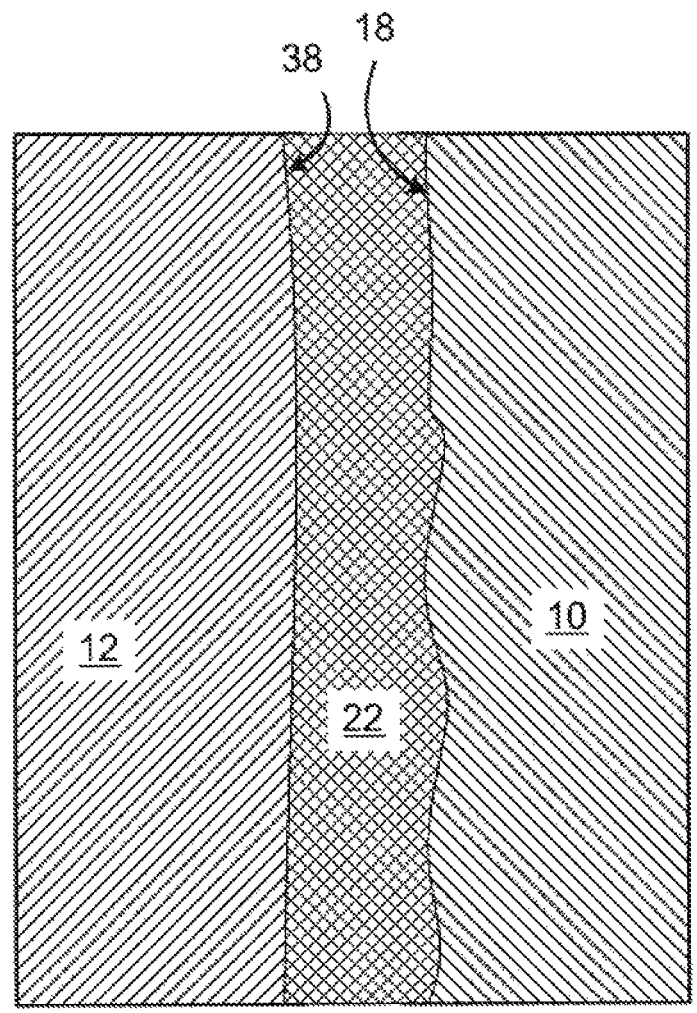
FIG. 4 is an enlarged cross-sectional view, not to scale, of a portion of a silicon substrate and a silicon oxide support material bonded together by a method according to the present disclosure.

In a further embodiment of the present disclosure, with reference to FIG. 4, a first substrate 10 may be bound to a second substrate 12. The first and second substrates 10 and 12 are selected from the group consisting of silicon, silicon nitride, silicon oxynitride, silicon carbide, and silicon oxide, wherein at least one of the substrates is silicon. A covalently bound layer of silicate glass may be formed as a bonding layer 22 between the two substrates. In one exemplary embodiment, the first substrate may be a silicon device and the second substrate may be a silicon oxide support material. The application of basic solution to the surfaces may help to ameliorate any surface roughness of the surface to which it is applied by filling in some of the gaps and dissolving some of the high spots on one or more of the bonding surfaces. Hence, the surfaces 18 and 38 need not be specially treated or planarized prior to the bonding process. The silicon surface may optionally be back-ground prior to the bonding process, however. A suitable surface roughness for the surfaces 18 may range from about 25 Angstroms to about one micron while surface 38 may be substantially planar or may have a surface roughness similar to the surface roughness of surface 18.

The foregoing embodiments are susceptible to considerable variation in their practice. Accordingly, the embodiments are not intended to be limited to the specific exemplifications set forth hereinabove. Rather, the foregoing embodiments are within the spirit and scope of the appended claims, including the equivalents thereof available as a matter of law.

The patentees do not intend to dedicate any disclosed embodiments to the public, and to the extent any disclosed modifications or alterations may not literally fall within the scope of the claims, they are considered to be part hereof under the doctrine of equivalents.

What is claimed is:

1. A process for making a substantially planar micro-fluid ejection head comprising:
  depositing a basic solution on a first surface of a device substrate having at least one fluid flow channel slot therein and at least one micro-fluid ejection device formed adjacent to a second surface thereof;
  contacting the first surface having the basic solution deposited thereon together with a surface of a support material for a duration ranging from about 1 minute to about 15 minutes, at a temperature ranging from about 20° C. to about 90° C. so that the first surface having the basic solution deposited thereon and the surface of the support material form a bond therebetween thereby hermetically sealing the support material and the device substrate to one another, wherein both the substrate and the at least one surface of the support comprise silicon, and wherein at least one of the device substrate and the at least one surface of the support material is substantially composed of silicon; and
  attaching a flow feature material having at least one fluid flow channel formed therein to the second surface of the device substrate.

2. The process of claim 1, further comprising depositing the basic solution on the surface of the support material prior to the contacting step.

3. The process of claim 1, wherein the step of contacting is performed under an atmosphere selected from the group consisting of hydrogen gas and a hydrogen-containing forming gas.

4. The process of claim 1, wherein the basic solution comprises an aqueous solution of tetramethylammonium hydroxide, wherein the concentration of tetramethylammonium hydroxide in the solution ranges from about 0.5% by weight to about 5% by weight of the total weight of the solution.

5. The process of claim 1, wherein the basic solution comprises an aqueous solution of tetramethylammonium hydroxide, wherein the concentration of tetramethylammonium hydroxide in the solution ranges from about 1% by weight to about 3% by weight of the total weight of the solution.

6. The process of claim 1, further comprising attaching a nozzle plate having at least one fluid ejection aperture formed therein to the flow feature material.

7. The process of claim 1, further comprising attaching a nozzle plate having at least one fluid ejection aperture and at least one fluid flow channel formed therein associated with the at least one fluid ejection aperture, to the second surface of the device substrate.

8. The process of claim 1, wherein the step of contacting further comprises applying a pressure ranging from about 1 psi to about 50 psi.

9. The process of claim 1, wherein the device substrate comprises:
a flow feature material having at least one fluid flow channel formed therein and attached to the second surface of the device substrate; and
a nozzle plate having at least one fluid ejection aperture formed therein attached to the flow feature material, wherein the nozzle plate and the flow feature material are formed from a single material or a plurality of materials.

10. A process for making a substantially planar micro-fluid ejection head comprising:
depositing a basic solution on a first surface of a device substrate having at least one fluid flow channel slot therein and at least one micro-fluid ejection device formed adjacent to a second surface thereof;
contacting the first surface having the basic solution deposited thereon together with a surface of a support material by applying a pressure ranging from about 1 psi to about 50 psi for a duration ranging from about 1 minute to about 15 minutes, at a temperature ranging from about 20° C. to about 90° C. so that the first surface having the basic solution deposited thereon and the surface of the support material form a bond therebetween thereby hermetically sealing the support material and the device substrate to one another, wherein both the substrate and the at least one surface of the support comprise silicon, and wherein at least one of the device substrate and the at least one surface of the support material is substantially composed of silicon; and
attaching a flow feature material having at least one fluid flow channel formed therein to the second surface of the device substrate.

11. The process of claim 10, further comprising depositing the basic solution on the surface of the support material prior to the contacting step.

12. The process of claim 10, wherein the step of contacting is performed under an atmosphere selected from the group consisting of hydrogen gas and a hydrogen-containing forming gas.

13. A process for making a substantially planar micro-fluid ejection head comprising:
depositing a basic solution on a first surface of a device substrate having at least one fluid flow channel slot therein and at least one micro-fluid ejection device formed adjacent to a second surface thereof, wherein the device substrate comprises:
a flow feature material having at least one fluid flow channel formed therein and attached to the second surface of the device substrate; and
a nozzle plate having at least one fluid ejection aperture formed therein attached to the flow feature material, wherein the nozzle plate and the flow feature material are formed from a single material or a plurality of materials;
contacting the first surface having the basic solution deposited thereon together with a surface of a support material for a duration ranging from about 1 minute to about 15 minutes, at a temperature ranging from about 20° C. to about 90° C. so that the first surface having the basic solution deposited thereon and the surface of the support material form a bond therebetween thereby hermetically sealing the support material and the device substrate to one another, wherein both the substrate and the at least one surface of the support comprise silicon, and wherein at least one of the device substrate and the at least one surface of the support material is substantially composed of silicon; and
attaching a flow feature material having at least one fluid flow channel formed therein to the second surface of the device substrate.

14. The process of claim 13, further comprising depositing the basic solution on the surface of the support material prior to the contacting step.

15. The process of claim 13, wherein the step of contacting is performed under an atmosphere selected from the group consisting of hydrogen gas and a hydrogen-containing forming gas.

16. The process of claim 13, wherein the basic solution comprises an aqueous solution of tetramethylammonium hydroxide, wherein the concentration of tetramethylammonium hydroxide in the solution ranges from about 0.5% by weight to about 5% by weight of the total weight of the solution.

17. The process of claim 13, wherein the basic solution comprises an aqueous solution of tetramethylammonium hydroxide, wherein the concentration of tetramethylammonium hydroxide in the solution ranges from about 1% by weight to about 3% by weight of the total weight of the solution.

18. The process of claim 13, further comprising attaching a nozzle plate having at least one fluid ejection aperture formed therein to the flow feature material.

19. The process of claim 13, further comprising attaching a nozzle plate having at least one fluid ejection aperture and at least one fluid flow channel formed therein associated with the at least one fluid ejection aperture, to the second surface of the device substrate.

* * * * *